United States Patent
Latzina et al.

(10) Patent No.: US 10,365,925 B2
(45) Date of Patent: Jul. 30, 2019

(54) MERGING APPLICATIONS

(71) Applicant: SAP SE, Walldorf (DE)

(72) Inventors: Markus Latzina, Wiesenbach (DE); Slavin Donchev, Mannheim (DE)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 15/427,417

(22) Filed: Feb. 8, 2017

(65) Prior Publication Data

US 2018/0225017 A1  Aug. 9, 2018

(51) Int. Cl.
  *G06F 8/70* (2018.01)
  *G06F 8/34* (2018.01)
  *G06F 8/35* (2018.01)

(52) U.S. Cl.
  CPC .............. *G06F 8/70* (2013.01); *G06F 8/34* (2013.01); *G06F 8/35* (2013.01)

(58) Field of Classification Search
  CPC ........................................................ G06N 5/02
  USPC .................................................. 715/763–765
  See application file for complete search history.

(56) References Cited

U.S. PATENT DOCUMENTS

2010/0125731 A1* 5/2010 Dasari ................... G06F 9/5061
                                                         713/155
2012/0072402 A1* 3/2012 Fraboulet-Laudy ..... G06N 5/02
                                                         707/705

* cited by examiner

*Primary Examiner* — Cao H Nguyen
(74) *Attorney, Agent, or Firm* — Buckley, Maschoff & Talwalkar LLC

(57) ABSTRACT

A communication port may exchange information with a user via a graphical user interface, and an application data store may contain information about executable applications, including input data and output data associated with each executable application. A merging platform may recognize that a user has selected, via the graphical user interface, a first executable application in the application data store. The merging platform may also recognize that the user has selected a second executable application in the application data store and receive an indication from the user that an application merging application is to be triggered. Responsive to this triggering, the merging application may merge behaviors of the first executable application and the second executable application, including functionality of the input and output data of each executable application, to create a merged application. The merging platform may then arrange to facilitate execution of the merged application.

18 Claims, 16 Drawing Sheets

MERGING APPLICATIONS

FIELD

Some embodiments are associated with ways in which a user may access application behaviors and functionality. In particular, some embodiments describe systems and methods to automatically merge multiple applications for a user.

BACKGROUND

An executable software application can let a user perform various functions. For example, a searching application may let a user define one or more search conditions and return a set of items or objects that satisfy those conditions (e.g., a set of file names created on a certain date, having a certain file size, etc.). Moreover, different types of applications will have different behaviors and/or functionality. For example, some applications may let a user group or otherwise connect items, annotate items, add or delete items, etc. In some cases, a user may need to utilize behaviors and functionalities of more than one type of application to perform a task. For example, he or she might need to use one application to determine a list of customers who meet particular criteria (e.g., based on home addresses, demographic information, etc.). The user might then need to use a different application to create a series of forms for each of those customers. In can be difficult, however, for a user to transfer results from application to another application. For example, he or she might need to export data from one application in accordance with a standardized protocol and then import that data into another application for further processing. Such an approach can be a time consuming and error-prone task—especially when a substantial number of objects or items might need to be transferred. Moreover, it can be difficult for users and administrators to understand the many different ways of moving data between applications (e.g., in some situations a user might have access to hundreds of different applications, each being associated with various input and/or output data formats).

It may therefore be desirable to provide systems and methods to facilitate ways in which functionality of multiple applications may be automatically merged into a single application in an efficient and flexible manner.

SUMMARY OF THE INVENTION

According to some embodiments, systems, methods, apparatus, computer program code and means are provided to facilitate ways in which functionality of multiple applications may be automatically merged into a single application in an efficient and flexible manner. In some embodiments, a communication port may exchange information with a user via a graphical user interface, and an application data store may contain information about executable applications, including input data and output data associated with each executable application. A merging platform may recognize that a user has selected, via the graphical user interface, a first executable application in the application data store. The merging platform may also recognize that the user has selected a second executable application in the application data store and receive an indication from the user that an application merging application is to be triggered. Responsive to this triggering, the merging application may merge behaviors of the first executable application and the second executable application, including functionality of the input and output data of each executable application, to create a merged application. The merging platform may then arrange to facilitate execution of the merged application.

Some embodiments comprise: means for recognizing, by a computer processor of a merging platform, that a user has selected, via a graphical user interface, a first executable application in an application data store, the application data store containing information about a plurality of executable applications, including input data and output data associated with each executable application; means for recognizing that the user has selected, via the graphical user interface, a second executable application in the application data store; means for receiving an indication from the user that an application merging application is to be triggered; responsive to said triggering, means for merging behaviors of the first executable application and the second executable application, including functionality of the input and output data of each executable application, to create a merged application; and means for arranging to facilitate execution of the merged application.

In some embodiments, a communication device associated with a back-end application computer server exchanges information with remote devices. The information may be exchanged, for example, via public and/or proprietary communication networks.

Technical effects of some embodiments of the invention are improved and computerized ways to facilitate ways in which functionality of multiple applications may be automatically merged into a single application in an efficient and flexible manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
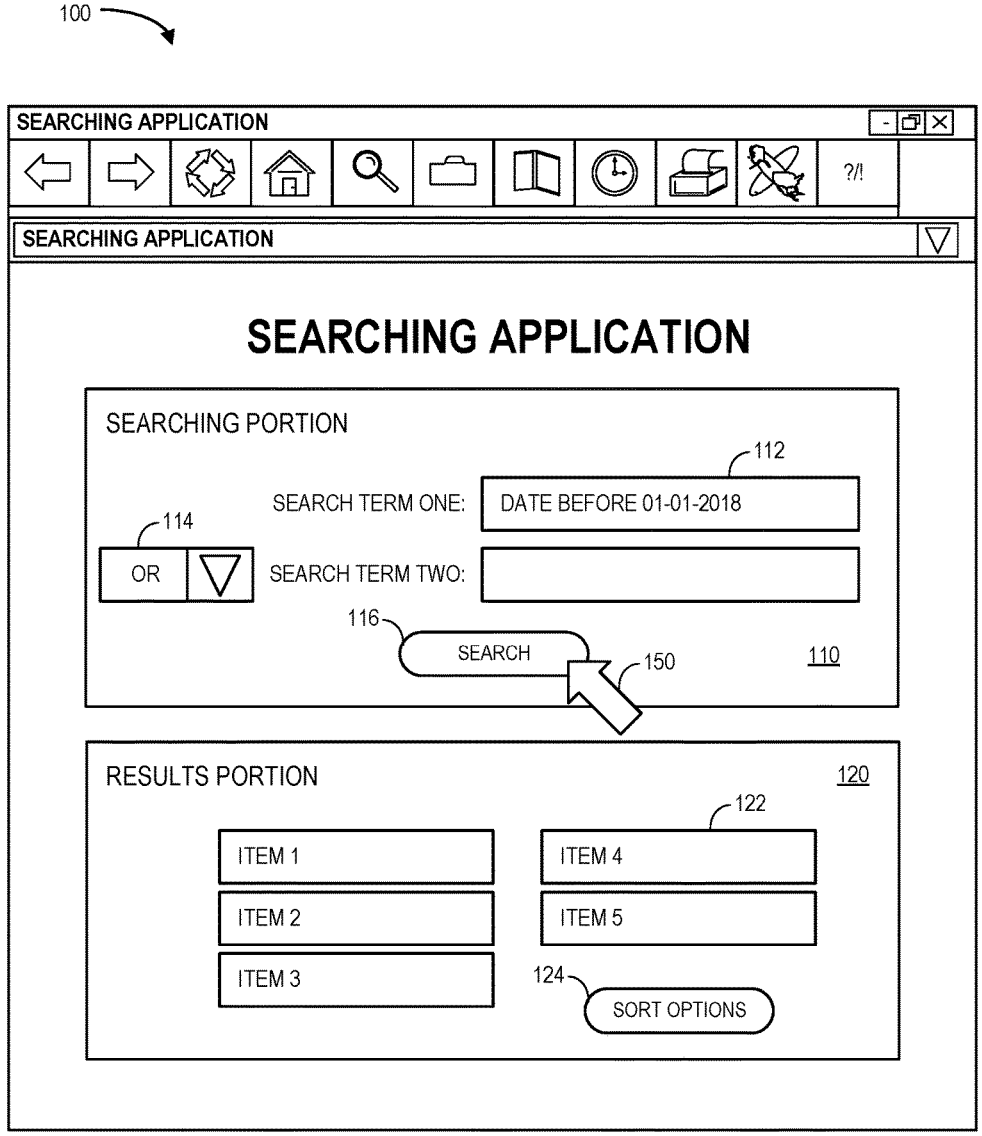
FIG. 1 illustrates an example of a searching application.
Figure 2:
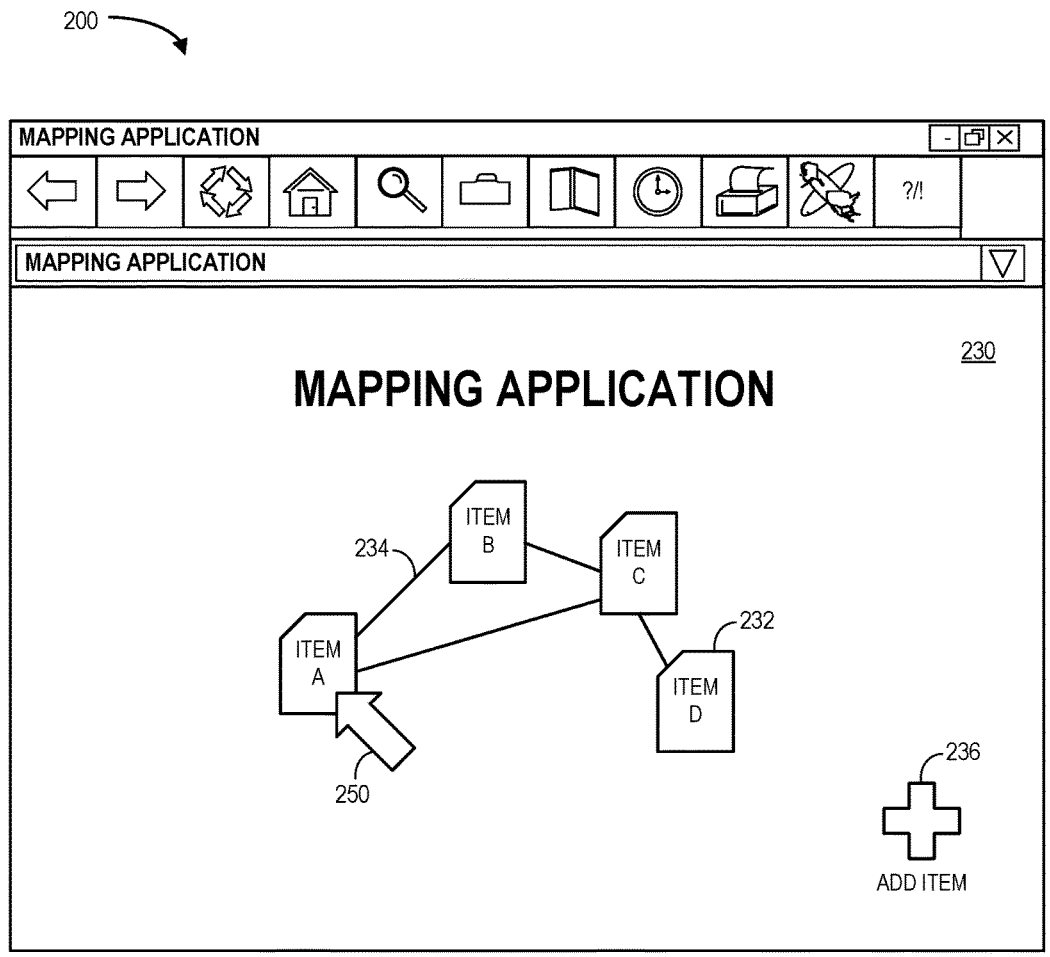
FIG. 2 illustrates an example of a mapping application.

Executable software applications may let a user perform various functions. For example, FIG. 1 illustrates an example of a searching application 100. The searching application 100 has a searching input portion 110 and a results portion 120. A user may enter one or more search terms 112 into the searching portion 120 (using Boolean operations 114 is desired). He or she may then activate a "Search" icon 116 (e.g., using a computer pointer 150 and mouse click) to execute a search in accordance with the search criteria defined by those terms 112. Responsive to that activation, the search application 100 may automatically populate the results portion 120 with a list of objects, files, or items 122 that satisfy the search criteria (e.g., items 1 through 5 as illustrated in FIG. 2). Note that the results portion 120 might contain a list or table of file names, a set of graphical icons representing items, etc. In some cases, a user may further manipulate the items 122 in the results portion 120 (e.g., by sorting the items 122 in various ways with a "Sort Options" icon 124, removing items, etc.). Note that updating the search terms 112 in the searching input portion 110 might automatically update the results portion 120 with new results.

Note that different types of applications will have different behaviors and/or functionality. Moreover, a user may need to utilize behaviors and functionalities of more than one type of application to perform a task. Consider, for example, FIG. 2 which illustrates an example of a mapping application 200. The mapping application 200 including a mapping area 230 that can display graphical representation of items 232 (e.g., items A though D as illustrated in FIG. 2). A user may utilize his or her computer pointer 250 to create connections or lines 234 between various items. The lines 234 might represent, for example, a particular type of relationship between the connected items 232 (e.g. with items A and B being connected while items A and D are not connected as illustrated by the lines 234 in FIG. 2). In some cases, a user may be able to adjust the items 232 that are included in the mapping area 230 (e.g., by deleting an item 232 or adding an item 232 using the "Add Item" icon 236). Note that in some embodiments, the lines 234 may represent directional connections (e.g., an arrowhead might be display at one end or both ends of a line 234).

In can be difficult, however, for a user to transfer results from application to another application. For example, he or she might need to export data from the searching application 100 of FIG. 1 in accordance with a standardized protocol and then import that data into the mapping application 200 of FIG. 2 for further processing. Such an approach can be a time consuming and error-prone task—especially when a substantial number of objects or items might need to be transferred. Moreover, it can be difficult for users and administrators to understand the many different ways of moving data between applications (e.g., in some situations a user might have access to hundreds of different applications, each being associated with various input and/or output data formats).

Figure 3:
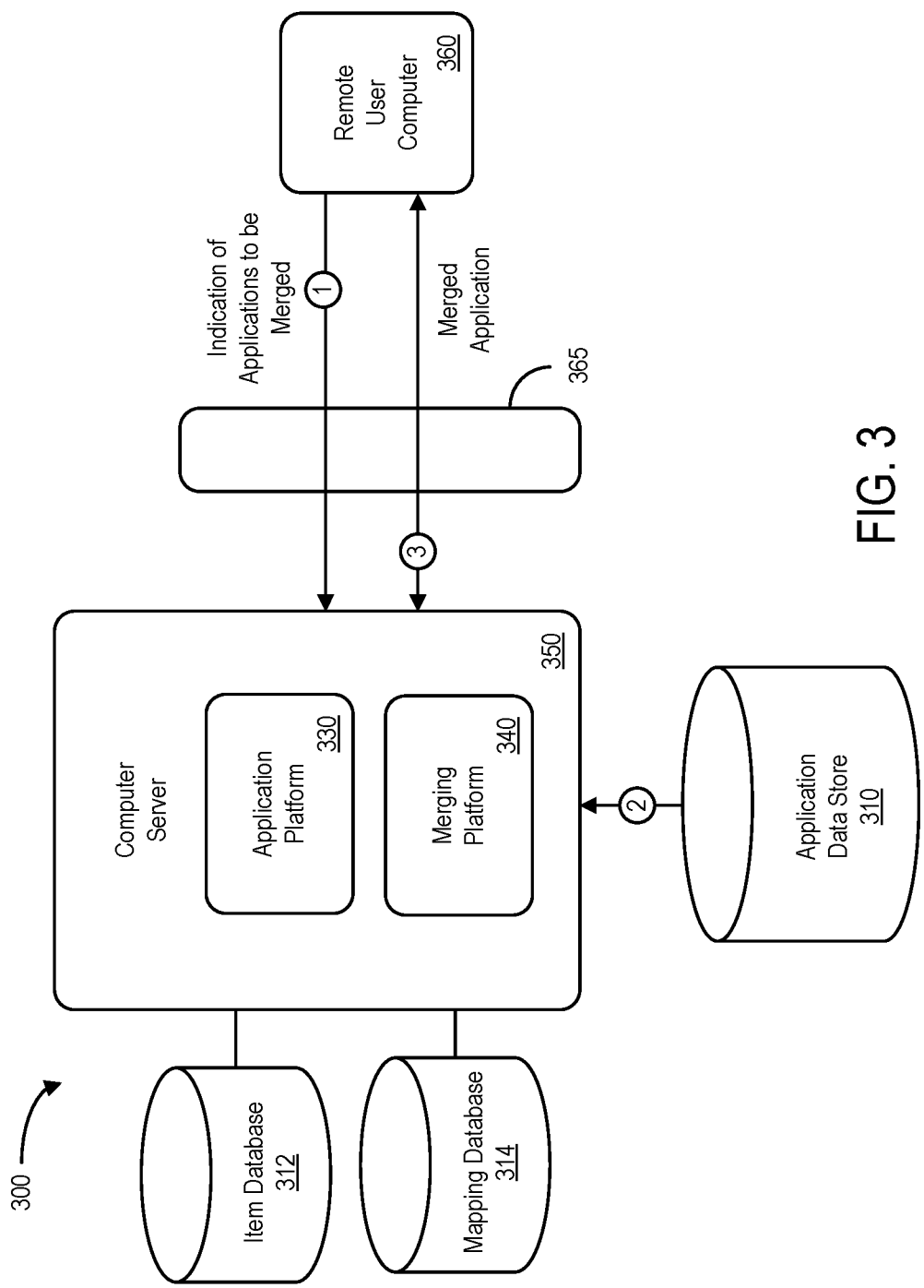
FIG. 3 is a high level block diagram of a computer system in accordance with some embodiments.

It may therefore be desirable to provide systems and methods to automatically facilitate a merging of behaviors and functionalities associated with multiple applications into a single merged application in an efficient and flexible manner. A used herein, the term "application" may refer to, in some cases, a program created at design time without incorporating or anticipating embodiments described herein. FIG. 3 is a high-level block diagram of a system 300 according to some embodiments of the present invention. In particular, the system includes an application data store 310 that provides information to a computer server 350. The application data store 310 might contain, for example, information about a plurality of executable applications, including input data and output data associated with each executable application. The computer server 350 may also exchange information with a remote user computer 360 (e.g., via a firewall 365) via an application platform 330 to facilitate use of an executable application. According to some embodiments, a merging platform 340 executes at the computer server 350 to facilitate an efficient and flexible ability to merge multiple applications into a single application. According to some embodiments, the computer server 350 and/or merging platform 340 might be associated with a third-party, such as a vendor that performs a service for an enterprise.

The computer server 350 might be, for example, associated with a Personal Computer ("PC"), laptop computer, smartphone, an enterprise server, a server farm, and/or a database or similar storage devices. According to some embodiments, an "automated" or "semi-automated" computer server 350 and/or merging platform 340 may process information that is provided to the remote user computer 360. As used herein, the term "automated" may refer to, for example, actions that can be performed with little (or no) intervention by a human.

As used herein, devices, including those associated with the computer server 350 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The computer server 350 may store information into and/or retrieve information from the application data store 310. The application data store 310 might, for example, store a set of electronic records representing executable applications. The computer server 350 and/or application platform 330 may also exchange information with an item database 312 (e.g., storing information that can be analyzed by a searching application such as the one described with respect to FIG. 1) and/or a mapping database 314 (e.g., storing information about connections between items that might be utilized by a mapping application such as the one described with respect to FIG. 2). The application data store 310 may be locally stored or reside remote from the computer server 350. As will be described further below, the application data store 310 may be used by the computer server 350 to automatically facilitate a merging of application behavior and/or functionality. Although a single computer server 350 is shown in FIG. 3, any number of such devices may be included. Moreover, various devices described herein might be combined according to embodiments of the present invention. For example, in some embodiments, the computer server 350 and application data store 310 might be co-located and/or may comprise a single apparatus.

According to some embodiments, the system 300 may facilitate a user's selection of applications in connection with a merge process via the computer server 350. For example, at (1) a user at a remote user computer 360 might select two (or more) applications and indicate that those applications should be merged. The computer server 350 and/or merging platform 340 may then access information in the application data store 310 at (2) and then combine the behavior and functionality of those applications. The computer server 350 may then facilitate execution of this newly created, merged application by exchanging information with the remote user computer 360 at (3) for display (rendering) and/or further user interactions. Note that the merging platform 340 may, in some embodiments, tightly and seamlessly interact with existing applications such that minimal setup requirements are necessary. Instead, the merging platform 340 may work with applications, plugins, and/or other functional elements so as to be available to users with minimal effort.

In some embodiments described herein, the system 300 may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 4:
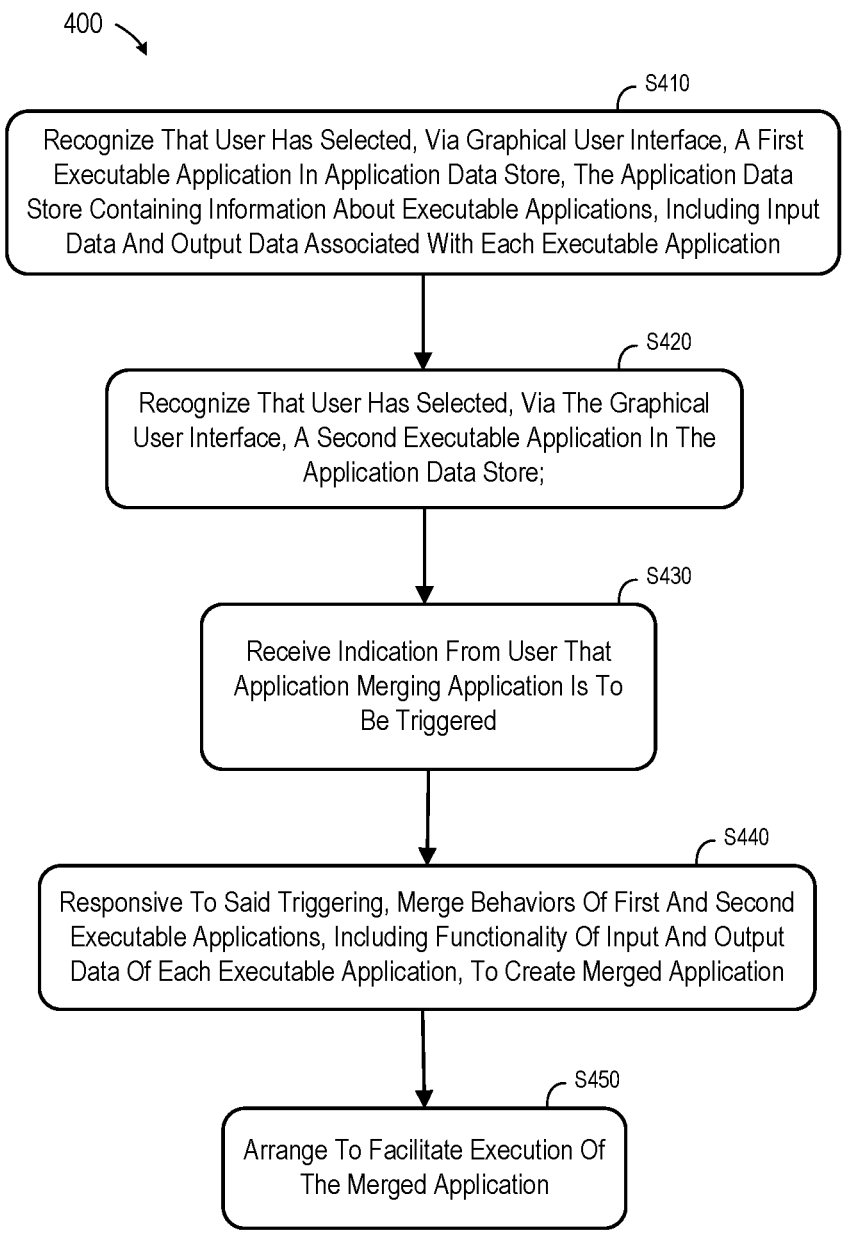
FIG. 4 is a flow diagram of a method according to some embodiments.

Note that the system 300 of FIG. 3 is provided only as an example, and embodiments may be associated with additional elements or components. According to some embodiments, the elements of the system 300 automatically facilitate the merging of multiple applications for a user. FIG. 4 illustrates a method 400 that might be performed by some or all of the elements of the system 300 described with respect to FIG. 3, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of a merging platform may recognize that a user has selected, via a graphical user interface, a first executable application in an application data store. The application data store may contain, for example, information about a number of different executable applications, including input data and output data associated with each of those executable applications. According to some embodiments, the graphical user interface may communicate via a communication port that exchanges information with a user through a remote user device via a distributed communication network. As used herein, the term "application" may refer to many different types of executable software programs (e.g., stand-alone applications, plug-ins, etc.). By ways of example only, an application could be associated with a searching application, a mapping application, grouping application, comparing application, a business application, a geographic map application (e.g., displaying items based on geographic location), an inventory application, a Human Resources ("HR") application (e.g., associated with a payroll procedure, an Information Technology ("IT") allocation process, etc.), a manufacturing application, a form-based application (e.g., to create paper or web-based forms), and/or a communication application (e.g., to generate or facilitate email messages, telephone calls, etc.).

At S220, the system may also recognize that the user has selected, via the graphical user interface, a second executable application in the application data store. Note that an application selection received from the user could include, according to some embodiments, a graphical drag-and-drop operation of a graphical representation of an executable application (e.g., a display icon or file name) into a merging display placeholder area.

At S230, the system may receive an indication from the user that an application merging application is to be triggered. Responsive to this triggering, the system may merge behaviors of the first executable application and the second executable application, including functionality of the input and output data of each executable application, to create a merged application at S240. Consider, for example, a first application having inputs of I1, I2, and I3 and outputs of O1, O2, and O3. In addition, a second application has inputs of I2, I4 (which is, in fact the same as O3) and outputs of O1 and O5. In this case, assuming that the first application "feeds" data to the second application, the merged application might have inputs of I1, I2, I3, and I4 and outputs of O1, O2, and O5. Of course, any number of other mappings might be provided as appropriate.

According to some embodiments, this merging is a run-time operation. Moreover, in some embodiments at least one of the first and second executable applications was not created at design time in accordance with the merging platform. In some cases, prior to the merging, the system may verify that the first and second executable applications represent a valid combination. If not, the system may transmit an error indication to the user (e.g., along with an explanation that may help the user solve the problem).

At S250, the system may arrange to facilitate execution of the merged application. The arranging to facilitate execution of the merged application might comprise, for example, arranging for the merged application to be executed via the graphical user interface. According to some embodiments, it might involve saving a copy of the merged application and/or transmitting information about the merged application to be executed by another user. In some embodiments, the system may further initiate a naming operation to assign a name to the merged application. The naming operation might comprise, for example, an automatic naming operation or a manual naming operation where the user defines the name for the merged application.

Although a merger of two executable application is described herein for clarity, note that embodiments may be associated with any number of executable applications (e.g., a merge might be further associated with a third executable application in the application data store). Similarly, according to some embodiments, the second executable application might itself actually be a merged application associated with two other executable applications. According to some embodiments, the system may subsequently receive from the user a trigger to separate the merged application. In this cases, responsive to the trigger, the system may re-create the first and second executable applications.

Figure 5:
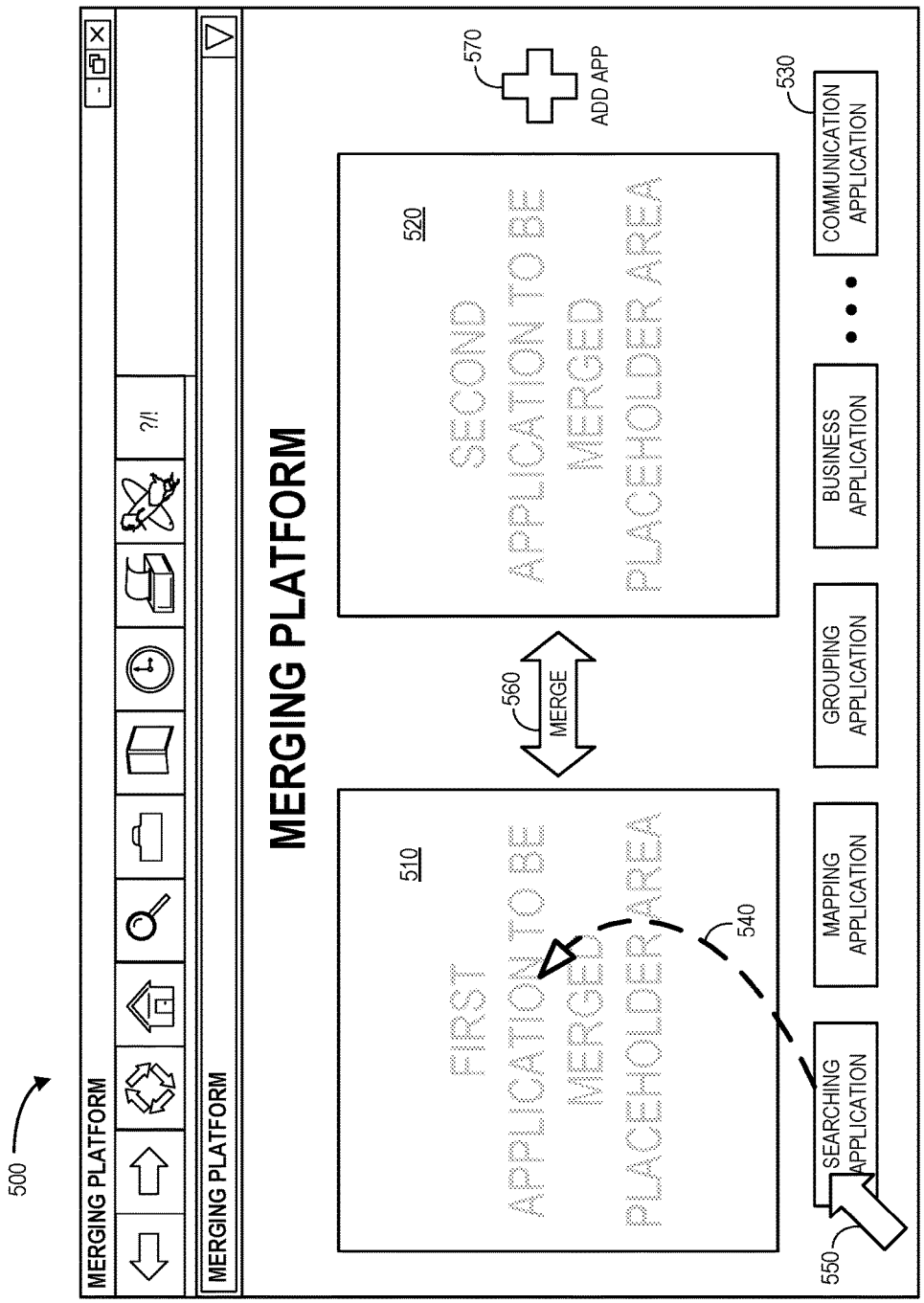
FIG. 5 through 7 illustrate the use of a graphical user interface to create a merged application according to some embodiments.

By way of example, consider FIG. 5 which illustrates a merging platform display 500 in accordance with some embodiments. The merging platform display 500 includes two placeholder areas 510, 520 that can be utilized by a user to select executable applications for the system. According to some embodiments, at least one selection received from the user involves a graphical drag-and-drop operation of a graphical representation 530 of an executable application into one of the placeholder areas 510, 520. For example, the graphical representation 530 of the searching application may be selected with a computer pointer 550 and dragged into the first placeholder area 510 as illustrated by the dashed arrow 540 in FIG. 5. Note that the merging platform display 500 may further include a merge icon 560 and an add application icon 570 as will be described.

Figure 6:
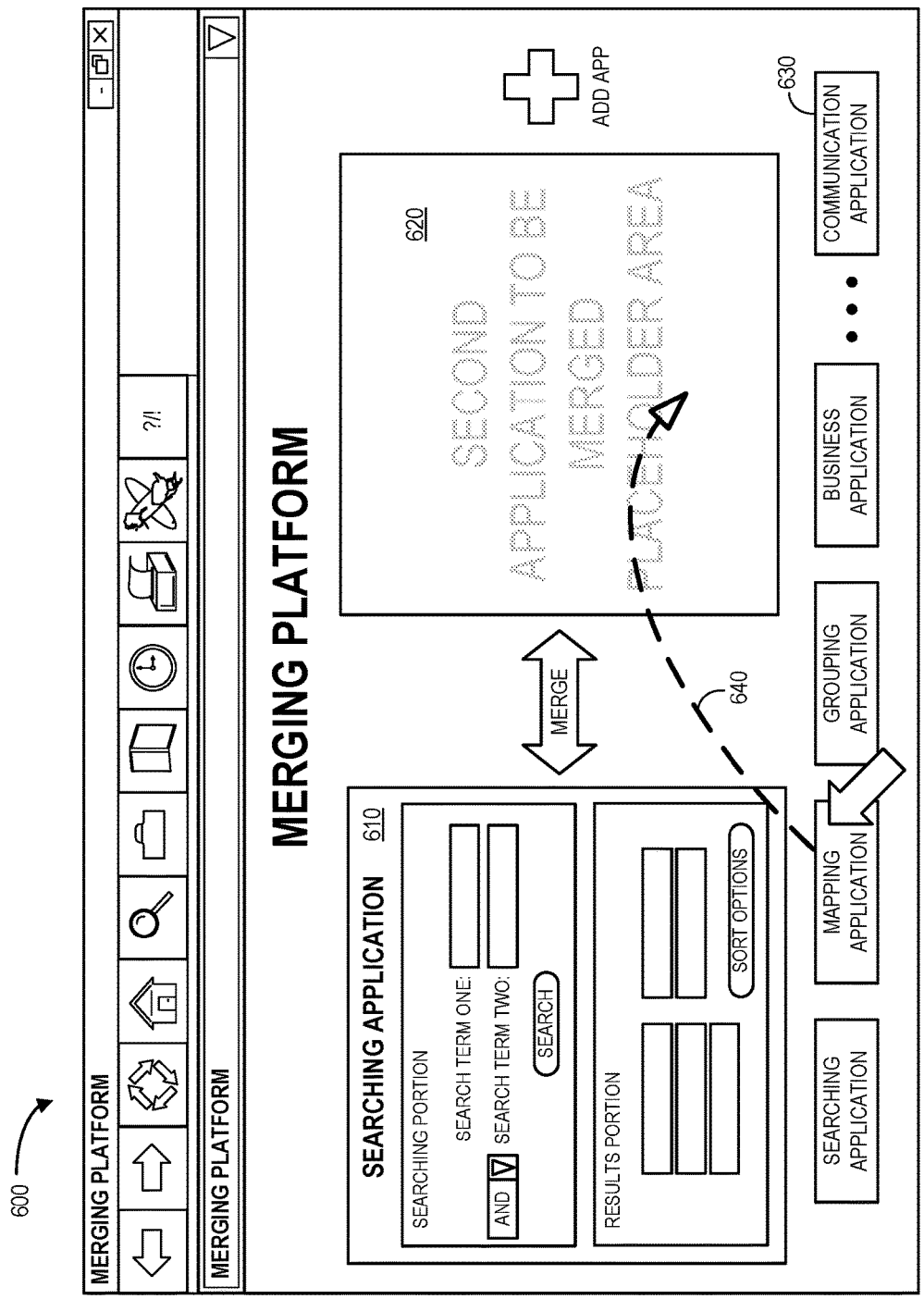

FIG. 6 illustrates a merging platform display 600 after the graphical representation 530 of the searching application has been selected and dragged into the first placeholder area 510 according to some embodiments. As can be seen, a first placeholder area 610 now displays the searching application. In this example, the graphical representation 630 of the mapping application is now selected with the computer pointer and dragged into a second placeholder area 620 as illustrated by the dashed arrow 640 in FIG. 6.

Figure 7:
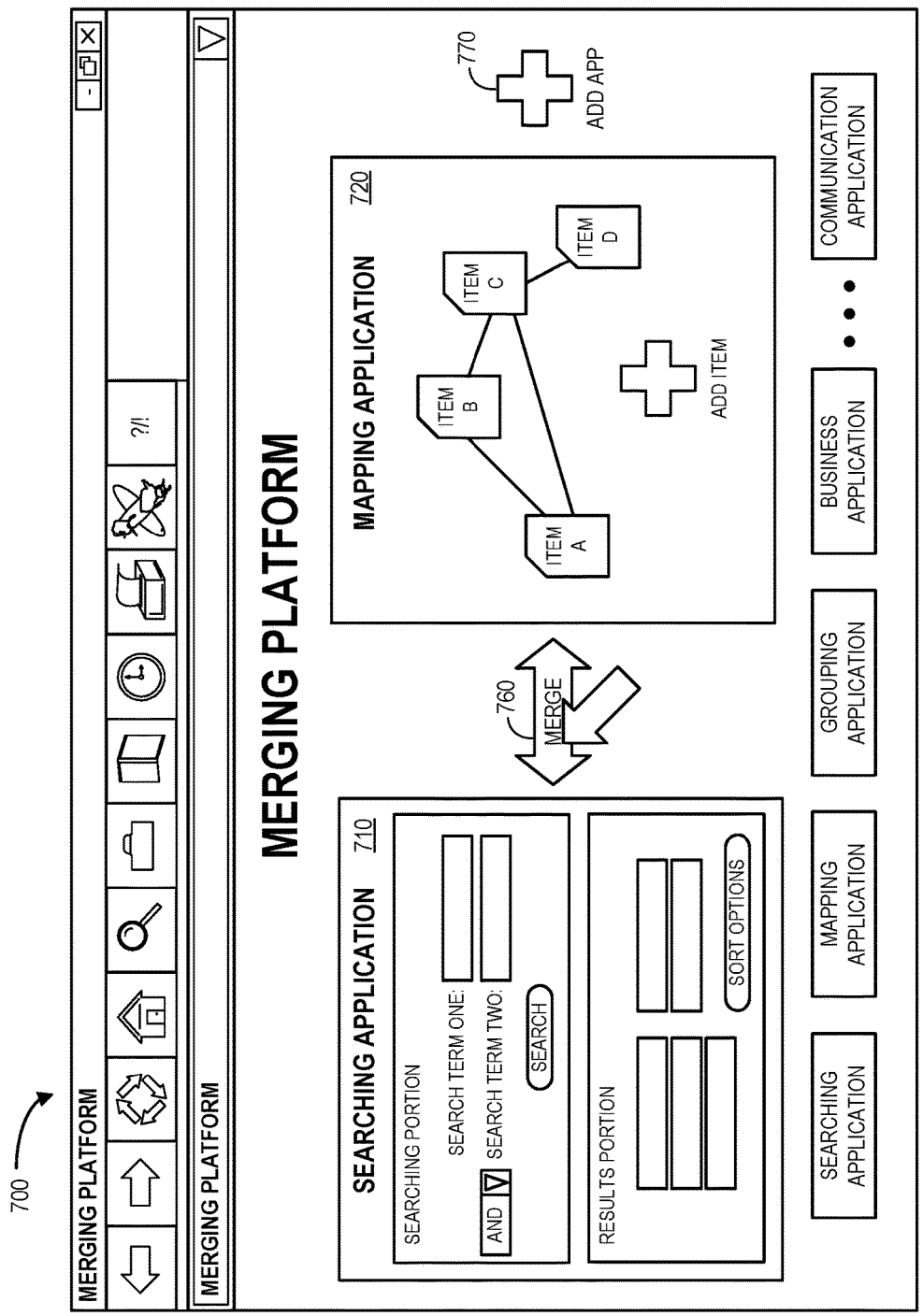

FIG. 7 illustrates a merging platform display 700 after the graphical representation 630 of the mapping application has been selected and dragged into the second placeholder area 620 according to some embodiments. As can be seen, a first placeholder area 710 still displays the searching application and a second placeholder area 720 now displays the mapping application. At this point, the user might select the "Add Application" icon to add additional executable application (e.g., a third application, a fourth application, etc.). When finished, the user may select the "Merge" icon 760 to trigger the merge of the selected applications (i.e., the searching application and the mapping application in the example of FIG. 7).

Figure 8:
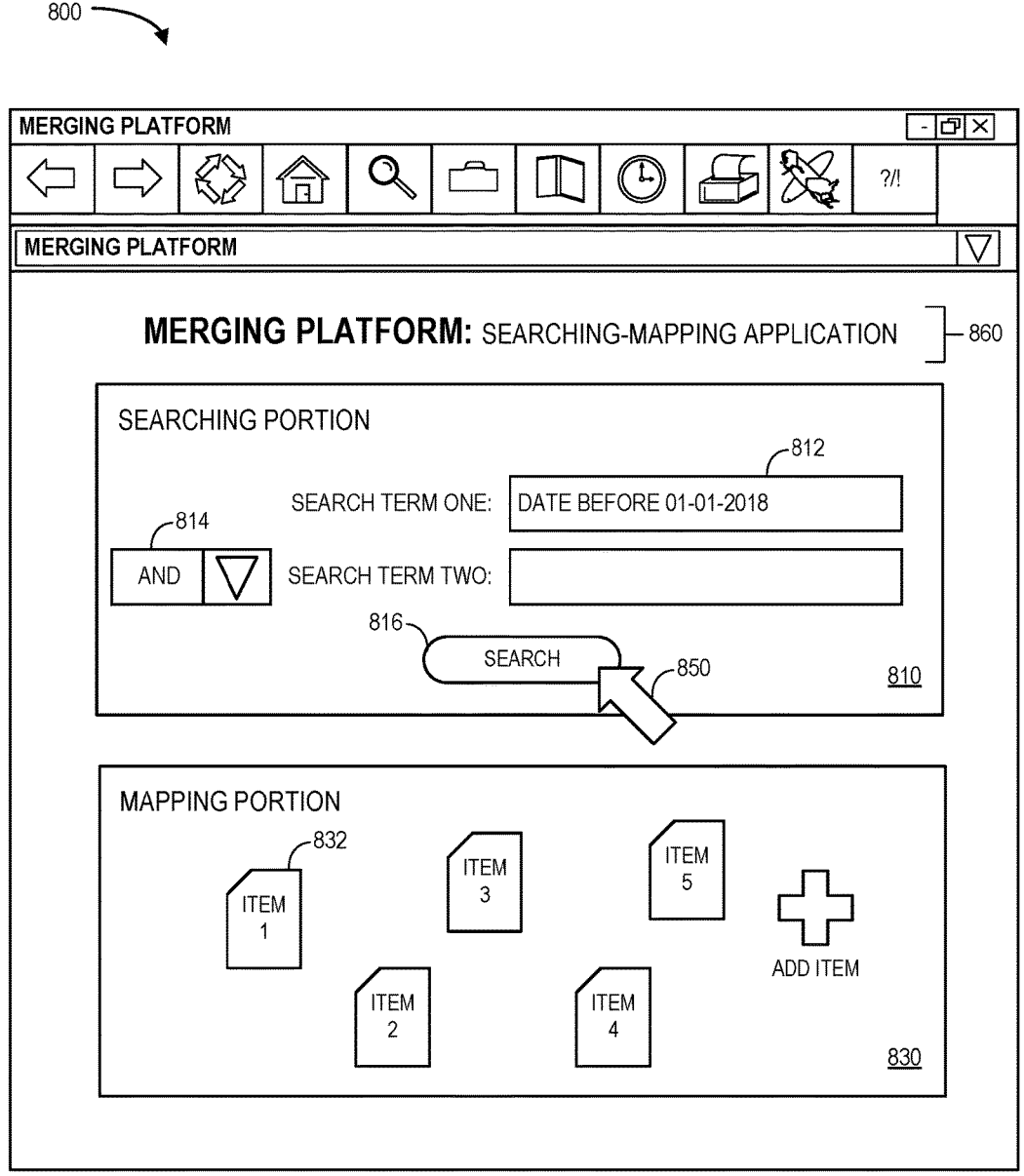
FIGS. 8 through 11 illustrate use of a merged application accordance with some embodiments.

The result of the triggering of this merge operation, according to some embodiments, is illustrated by the merging platform display 800 of FIG. 8. The display 800 may be automatically generated and includes a searching portion 810 (associated with the searching application described with respect to FIG. 1) and a mapping portion 830 (associated with the mapping application described with respect to FIG. 2), both being associated with a single merged application. A user may enter one or more search terms 812 (and associated Boolean operators 814 if desired) into the searching portion 810. Activation of a "Search" icon 816 by a computer pointer 850 will result in the generation of a set of items that satisfy the search criteria. According to some embodiments, this set of items is automatically displayed on the mapping portion 830. That is, items 832 (items 1 through 5) satisfied the "Date Before Jan. 1, 2018" search term 812 that was input by the user via the searching portion 810. As a result, the user does not need to export information from one application (e.g., the searching application) and import that information into another application (e.g., the mapping application). According to some embodiments, the merging platform may automatically generate a name 860 for the merged application (e.g., "Searching-Mapping Application"). According to other embodiments, the user may provide a name and/or modify an automatically generated name.

Figure 9:
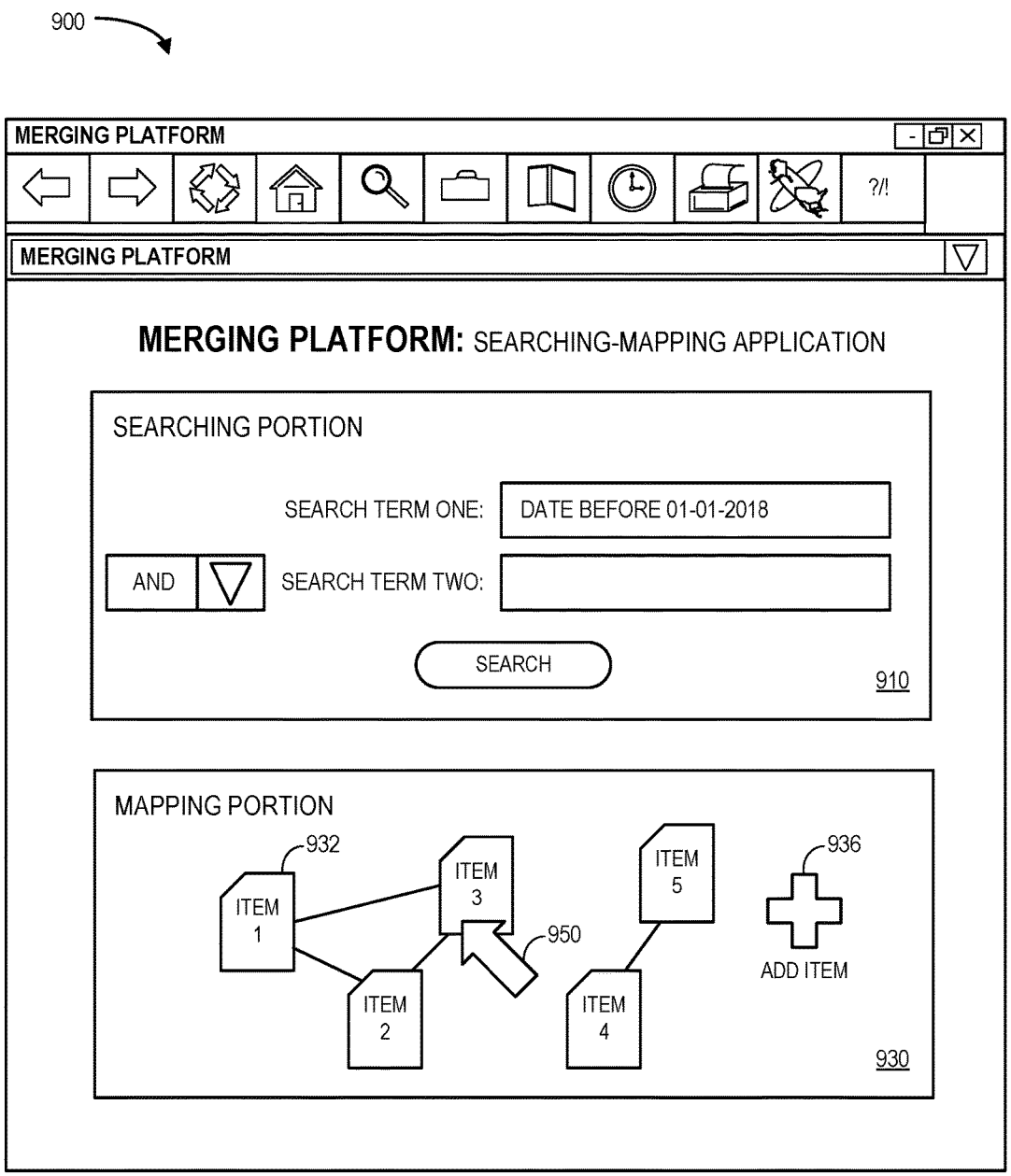

Once the items 832 are displayed in the mapping portion 810, the user may interact with elements (e.g., in a fashion similar to that described with respect to FIG. 2). For example, FIG. 9 illustrates a merging platform display 900 with a searching portion 910 and a mapping portion 930 that was automatically populated with items 932 as described with respect to FIG. 8. In particular, a user may select items 932 with the computer pointer 950, establish connection between items (e.g., as illustrated by the line connecting item 1 and item 3 shown in FIG. 9), activate an "Add Item" icon 936, etc.

Figure 10:
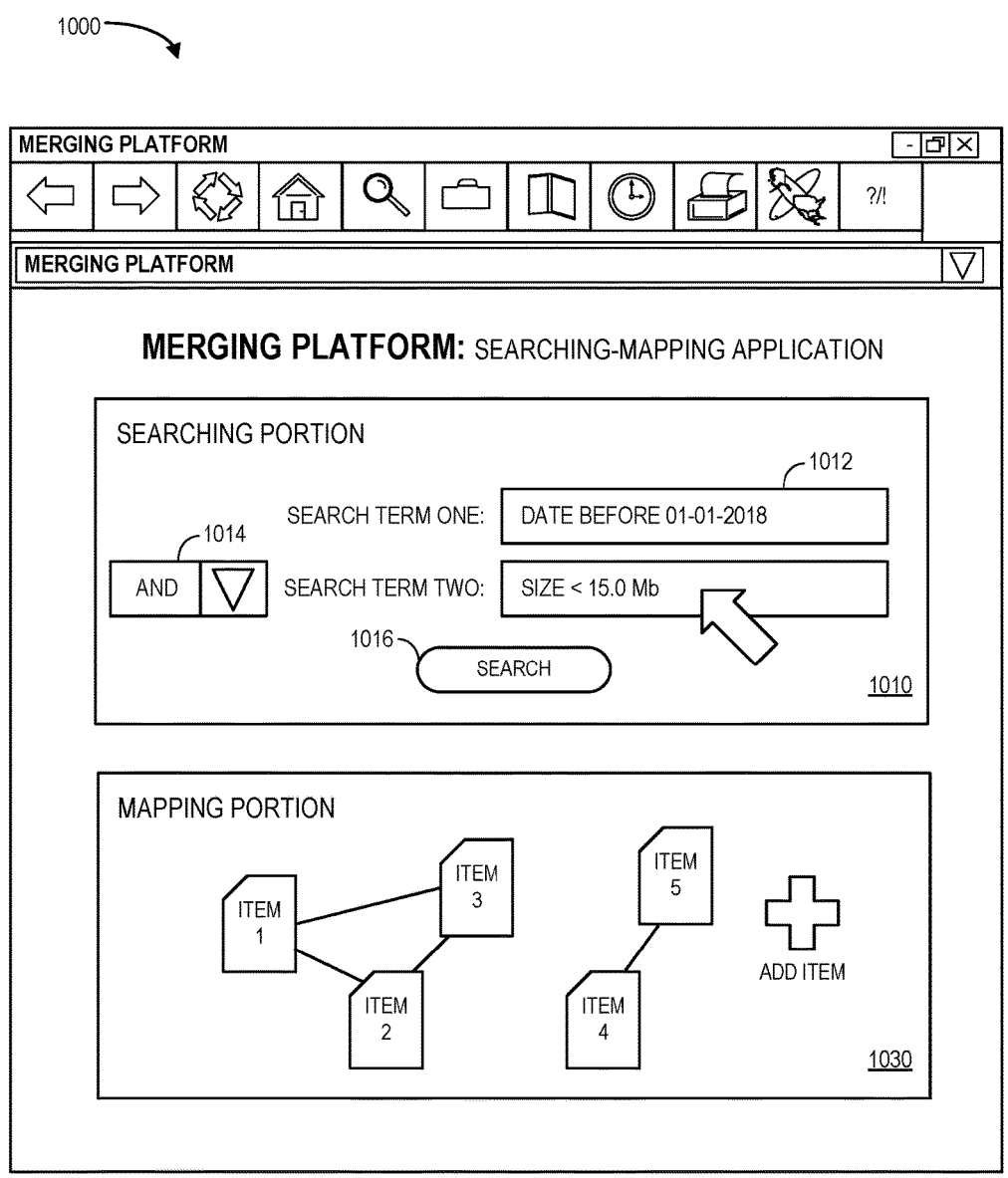

After the user begins interacting with the mapping portion 930, note that he or she may again interact with the searching portion 910. For example, FIG. 10 illustrates a merging platform display 1000 where the user has added a second search term to the searching portion 1010. In particular, the user has define a search looking for items with both (as indicated by the "AND" Boolean operator 1014) a "Date Before Jan. 1, 2018" and a "Size<15.5 Mb" (as entered in the search terms 1012).

Figure 11:
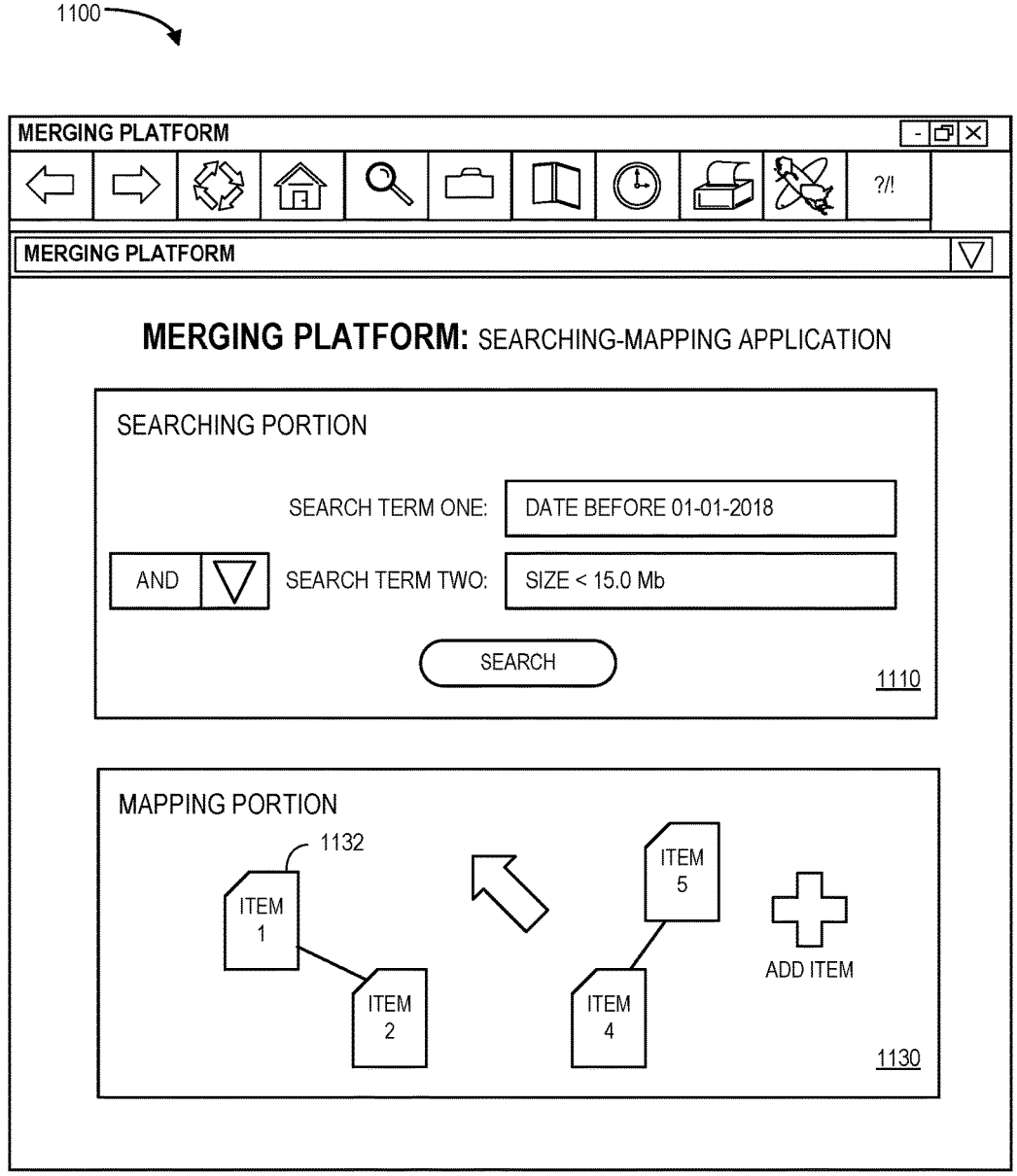

Upon selection of the "Search" icon 1016, the system will automatically update the mapping portion 1030. For example, FIG. 11 illustrates a merging platform display 1100 after the search defined in the searching portion 1110 has been initiated by the user. As a result of the new condition, only items 1, 2, 4, and 5 are displayed on the mapping portion 1130. That is, the addition of a new search term has caused item 3 to no longer satisfy the search criteria and, as a result, it has been automatically removed from the mapping portion. Note that the connection from item 2 to item 1 has also been automatically removed.

According to some embodiments, lines between items might also be automatically re-routed. Consider, for example, a mapping portion that displays items W, X, Y, and Z with the following connections: W-to-X, X-to-Y, and Y-to-Z. If the user adds a new search term (e.g., in a searching portion of an automatically merged application) such that only items W, X, and Z now satisfy the search conditions, the system might update the connections as follows: W-to-X, and X-to-Z. That is, because there was originally a path from X to Z (i.e., through X) that path might be maintained even when item X is removed from the display.

Thus, embodiments may be associated with a runtime configuration of an application User Interface ("UI") to facilitate the merging of two or more applications into a single application. According to some embodiments, a user can combine several applications in an ad hoc manner to perform a task in an integrated manner which requires the combination of the functionalities of each concerned application. The user may merge two or more applications into a single application substantially seamlessly, without the need to use a separate and/or dedicated configuration UI. Also, the newly created application (i.e., the merged application) may be persisted so that the user (and, potentially, other users) can access it at a later time.

As a concrete example, a first application may be a search application that contains common search functionality, thus allowing the user to enter search keywords and retrieve results, with some query algorithms for processing and some rendering capabilities for manipulating the results (e.g., sorting). A second application may be a mapping application where users can create items and connections between the items according to some visual graph notation (e.g., using boxes and arrows to represent items (nodes) and connections or "edges"). Conventionally, a user can interact either with the search application or, exclusively, with the mapping application. As a result, items will remain only in the application in which they were created. For the searching application, these would be the result items. For the mapping application, these would be user-generated items in the form of boxes plus any additional user-generated connections between those boxed.

According to the present embodiment, a user may merge the two standalone applications into a new, single application (the "merged application"), thus combining their separate functionalities for use in an integrated manner. For example, the user may retrieve items through the search UI (or search UI subarea) which was originally part of the searching application and is now is merely a portion of the new integrated merged application. Retrieved items will automatically appear in the mapping portion which was originally part of the mapping application and now is merely a portion of the newly created merged application. Rather than limiting the mapping UI part to the display area of the search UI, the user still can use the previous functionality of the original mapping application, thus adding new items, creating user-generated items, and/or connecting items (e.g., including both user-generated items and item retrieved through the search UI). In order to facilitate the reuse of this newly created merged application, the user may assign it a new title, thus making it easier to identify and activate at a later time.

According to some embodiments, the application UI may provide application merging functionality in any of a number of different ways. To help a user merge two or more applications in an intuitive and straightforward way, one embodiment may contain an area with placeholders into which the original applications can be dropped (one-by-one). As a result, the newly created application may combine the functionality of both original applications and can be otherwise treated as a complete application in its own right.

Embodiments may provide substantial benefits because end users may decide, on their own, which applications they want to combine or merge into a single application, taking advantage of the combined functionality of otherwise unconnected applications (which may provide significant synergies). As a consequence, coordination and implementation efforts can be reduced software manufacturers (lowering the total cost of software development and use). Also, embodiments may lower the risk of wrongly guessing which behaviors and/or functionalities users may expect in combined offerings of applications. Note that embodiments might be to any computing environment hosting applications that can normally be used only in an isolated fashion (and which cannot normally be merged into a new single application).

Although some embodiments are described herein with respect to the merging of multiple Graphical User Interface ("GUI") based applications (e.g., the searching and application applications), note that embodiments may be used in connection with other types of applications. For example, one or more applications using a conversation or speech-based user interface could be merged in accordance with any of the embodiments described herein. Likewise, the merging platform itself might not be implemented using a GUI platform (for example, the merging process might be triggered via a voice interface).

Figure 12:
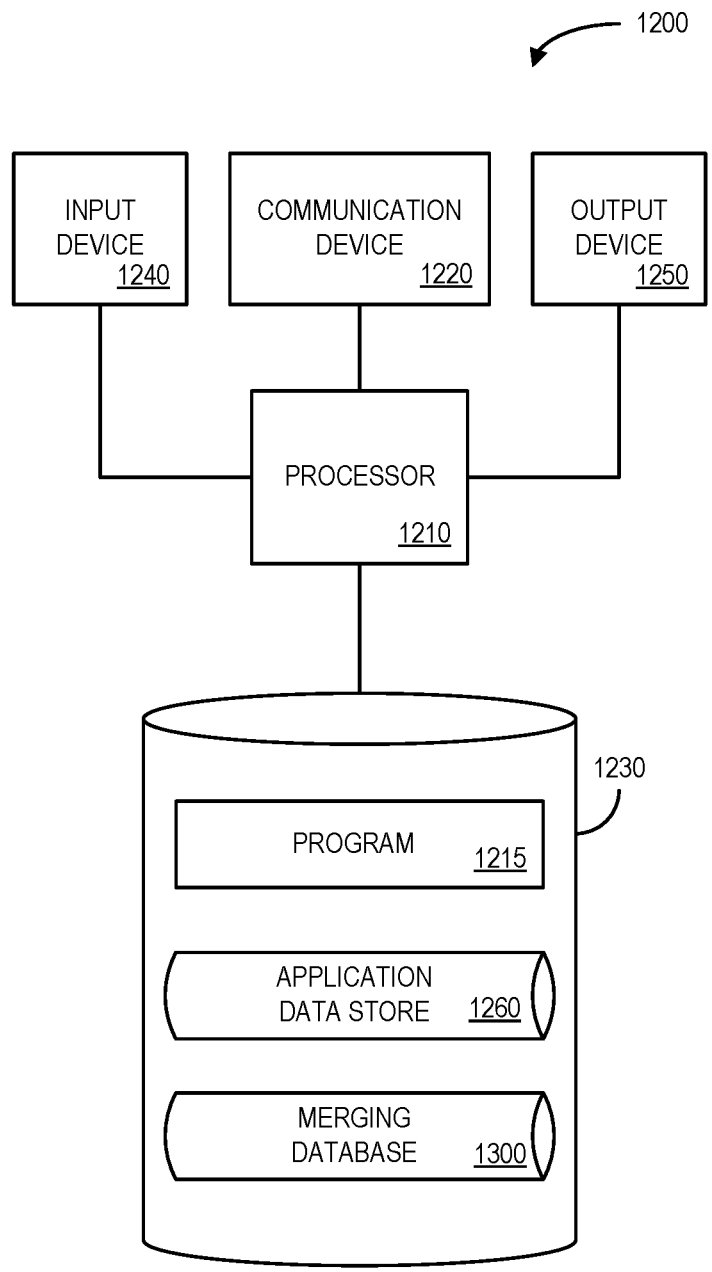
FIG. 12 is a high level diagram of an apparatus or platform in accordance with some embodiments.

Embodiments described herein may comprise a tool or plug-in that facilitates the automatic merging of multiple executable applications for a user. For example, FIG. 12 illustrates a merging apparatus or platform 1200 that may be, for example, associated with the system 300 of FIG. 3. The merging platform 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote user devices (e.g., PCs and smartphones). Note that communications exchanged via the communication device 1220 may utilize security features, such as those between a public internet user and an internal network of the insurance enterprise. The security features might be associated with, for example, web servers, firewalls, and/or PCI infrastructure. The merging platform 1200 further includes an input device 1240 (e.g., a mouse and/or keyboard to enter information about merge capabilities, input and output requirements, etc.) and an output device 1250 (e.g., to output reports regarding user merge activities, error logs, and/or overall system utilization).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or an application merging tool or application for controlling the processor 1210. The processor 1210 performs instructions of the program 1215, and thereby operates in accordance with any of the embodiments described herein. For example, the processor 1210 may exchange information with a user via a graphical user interface and access an application data store containing information about executable applications (including input data and output data associated with each executable application). The processor 1210 may recognize that a user has selected, via the graphical user interface, a first executable application in the application data store. The processor 1210 may also recognize that the user has selected a second executable application in the application data store and receive an indication from the user that an application merging application is to be triggered. Responsive to this triggering, the processor 1210 may merge behaviors of the first executable application and the second executable application, including functionality of the input and output data of each executable application, to create a merged application. The processor 1210 may then arrange to facilitate execution of the merged application.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the merging platform 1200 from another device; or (ii) a software application or module within the merging platform 1200 from another software application, module, or any other source (including, for example, web pages, web content, etc.).

In some embodiments (such as shown in FIG. 12), the storage device 1230 further stores an application data store 1260 (e.g., associated with different applications associated with an enterprise) and a merging database 1300. An example of a database that might be used in connection with the merging platform 1200 will now be described in detail with respect to FIG. 13. Note that the database described herein is only an example, and additional and/or different information may be stored therein. Moreover, various databases might be split or combined in accordance with any of the embodiments described herein. For example, the application data store 1260 and/or merging database 1300 might be combined and/or linked to each other within the program 1215.

Figure 13:
FIG. 13 is a portion of a merging database that might be provided according to some embodiments.

Referring to FIG. 13, a table is shown that represents the merging database 1300 that may be stored at the merging platform 1200 according to some embodiments. The table may include, for example, entries identifying merged applications that have been created for a user (or group of users) by the system. The table may also define fields 1302, 1304, 1306, 1308, 1310 for each of the entries. The fields 1302, 1304, 1306, 1308, 1310 may, according to some embodiments, specify: a merged application identifier 1302, component executable application identifiers 1304, a data and time of merge trigger 1306, a merged name 1308, and a valid combination status 1310. The merging database 1300 may be created and updated, for example, based on information electronically received from a merging platform and/or users (e.g., via interactive graphical displays).

The user action identifier 1302 may be, for example, a unique alphanumeric code identifying a merged application that was automatically created for a user (e.g., by a merging platform). The component executable application identifiers 1304 may identify which applications (e.g., which two applications, three applications, etc.) were included in the merged application. The date and time of merge trigger 1306 may indicate when the user initiated the merge operation. The merged name 1308 might be alphanumeric name assigned the merged application (e.g., automatically or manually by the user) that could be used, for example, to save the merged application, access the merged application at a later time, transmit the application (or a pointer to the application) to another user, etc. The valid combination status 1310 might indicate a result of an automatically review performed by the system to see if the component executable applications identifiers are compatible with an automatic merge operation (e.g., "valid" or "error")

Figure 14:
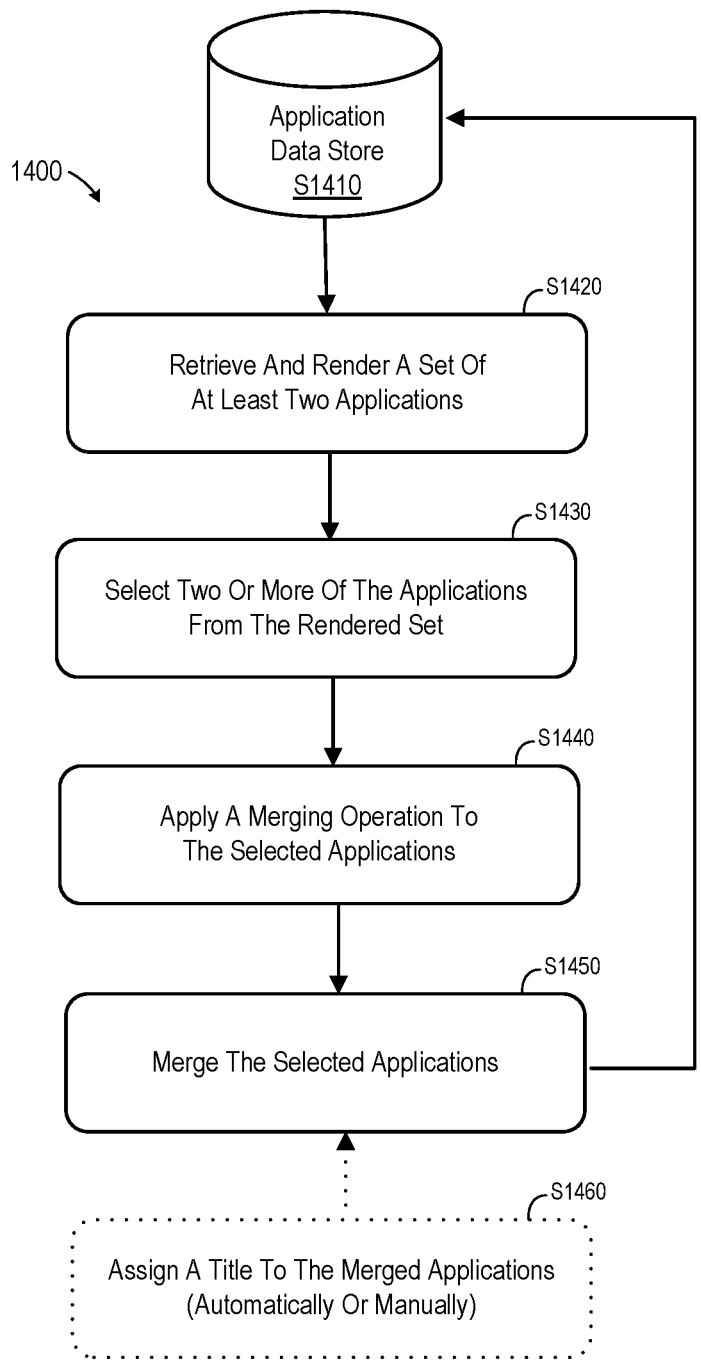
FIG. 14 is a more detailed process diagram example in accordance with some embodiments.

FIG. 14 is a more detailed process diagram 1400 example in accordance with some embodiments. At S1410, an application data store may contain a library of applications (of many different types) that are utilized by users of an enterprise. At S1420, the system may retrieve and render of set of at least two applications. The set of applications may be retrieved and rendered, for example, based on tasks currently being performed by a user. At S1430, the user may select two or more of the applications from the rendered set. For example, the user might drag-and-drop icons, click checkboxes, highlight application names in a list of name, etc. to indicate his or her selections to the system. At S1440, the system may apply a merging operation to the selected applications, and the selected applications may then be merged into a single, merged application at S1450. At S1460, a title might be assigned to the merged selected applications (e.g., the newly created, single application might be named either automatically or manually). Note that the naming step may be optional, as indicated by the dotted line of FIG. 14. The merged application may then be stored into the application data store (as a single, standalone application) at S1410.

Figure 15:
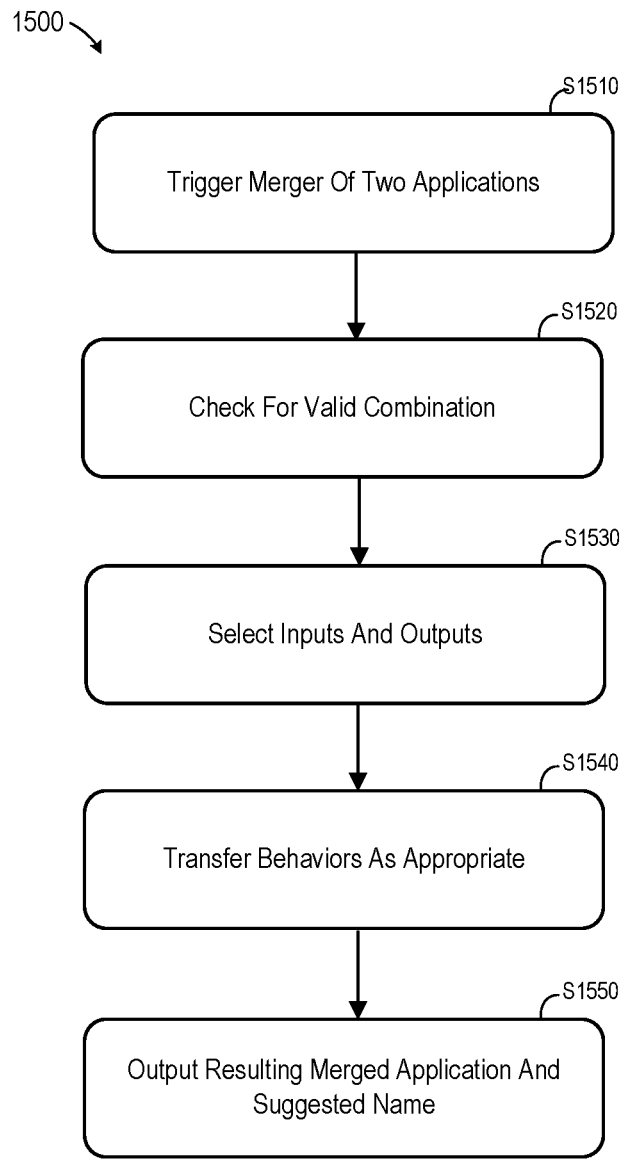
FIG. 15 is another process diagram in accordance with some embodiments.

FIG. 15 is another process diagram 1500 example in accordance with some embodiments. At S1510, a user action may trigger a merging of two (or more) applications. At S1520, the system may check if the applications indicated at S1510 comprise a valid combination. For example do the inputs required by one application match the outputs that are generated by the other application? If a valid combination is found, the system may select appropriate input and output information at S1530. For example, the system may map inputs to outputs, outputs to inputs, etc. At S1540, the system may transfer behaviors and/or functionalities as appropriate. At S1550, the resulting merged application may be output for utilization by the user. According to some embodiments, the system may also generate a suggested name for the merged application (e.g., by concatenating alphanumeric characters from the name of a first application with alphanumeric characters from the name of a second application).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 16:
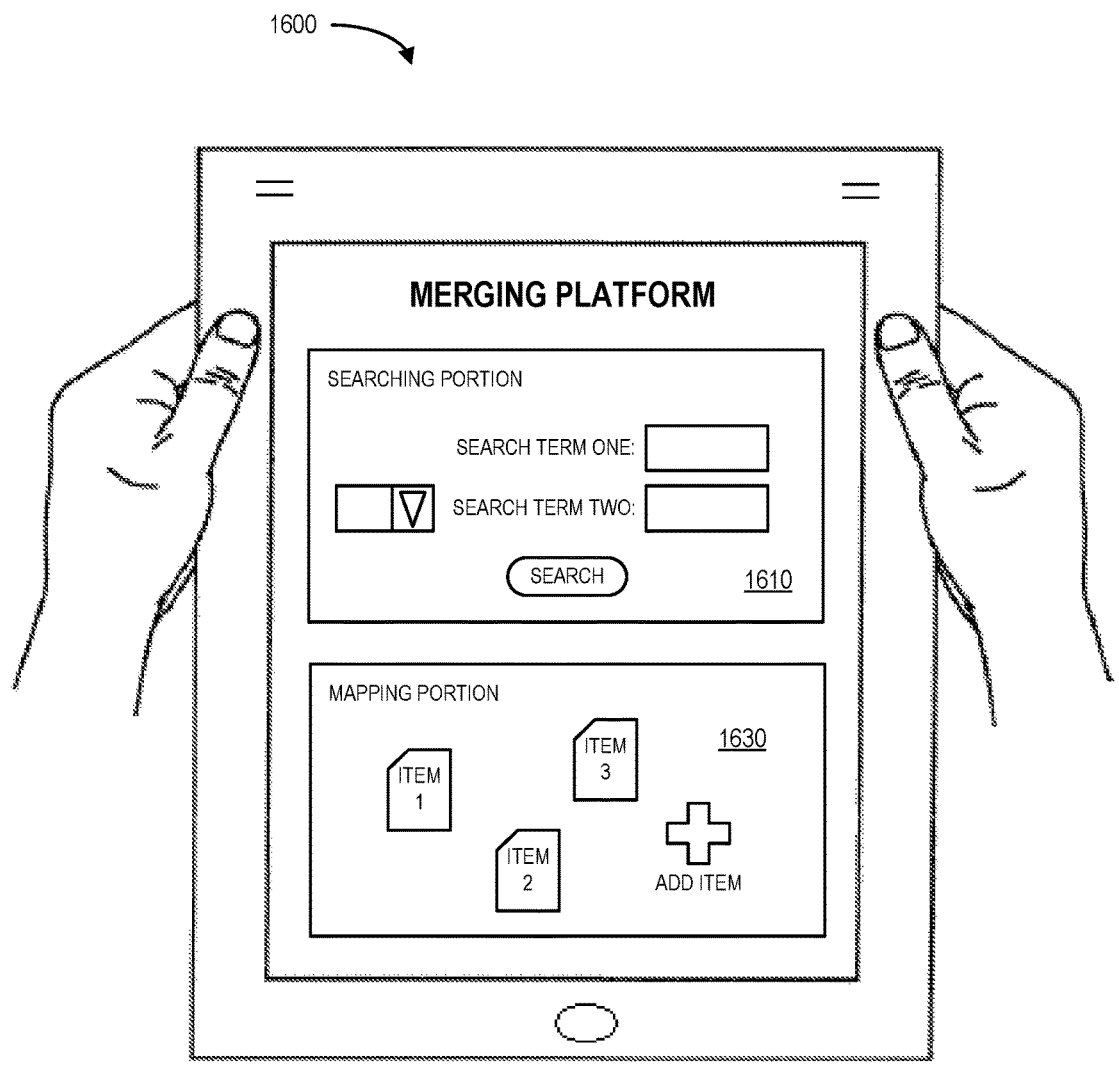
FIG. 16 illustrates a tablet or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of data structures and attribute characteristics, embodiments may instead be associated with other types of data (e.g., additional information might be collected and/or automatically used about applications being merged, usage of merged applications, etc.). Still further, the displays and devices illustrated herein are only provided as examples, and embodiments may be associated with any other types of user interfaces. For example, FIG. 16 illustrates a tablet or handheld computer 1600 being used according to some embodiments. In particular, computer 1600 includes a merging platform display 1610 with a searching portion 1610 and a mapping portion 1620. In this way, a user might utilize a touch sensitive screen enter search terms and graphically link result items in accordance with any of the embodiments described herein.

Embodiments described herein are solely for the purpose of illustration. Those in the art will recognize other embodiments may be practiced with modifications and alterations to that described above.

What is claimed is:
1. A system, comprising:
 a communication port to exchange information with a user via a graphical user interface;
 an application data store containing information about a plurality of executable applications, including input data and output data associated with each executable application; and
 a merging platform, coupled to the communication port and application data store, including:
  a memory storing processor-executable program code, and
  a computer processor to execute the processor-executable program code in order to cause the merging platform to:
   recognize that a user has selected, via the graphical user interface, a first executable application in the application data store by receiving from the user a graphical drag-and-drop operation of a graphical representation of the first executable application into a first merging display placeholder area,
   recognize that the user has selected, via the graphical user interface, a second executable application in the application data store by receiving from the user a graphical drag-and-drop operation of a graphical representation of the second executable application into a second merging display placeholder area,
receive an indication from the user that an application merging application is to be triggered,
responsive to said triggering, merge behaviors of the first executable application and the second executable application, including functionality of the input and output data of each executable application, to create a merged application, and
arrange to facilitate execution of the merged application.

2. The system of claim 1, wherein said arranging to facilitate execution of the merged application is associated with at least one of: (i) arranging for the merged application to be executed via the graphical user interface; (ii) saving a copy of the merged application, and (iii) transmitting information about the merged application to be executed by another user.

3. The system of claim 1, wherein at least one of the first and second executable applications are associated with at least one of: (i) a searching application, (ii) a mapping application, (iii) a grouping application, (iv) a comparing application, (v) a business application, (vi) a geographic map application, (vii) an inventory application, (viii) a human resources application, (ix) a manufacturing application, (x) a form-based application, and (xi) a communication application.

4. The system of claim 1, wherein said merging is a runtime operation.

5. The system of claim 1, wherein execution of the processor-executable program code further cause the merging platform to:
initiate a naming operation to assign a name to the merged application.

6. The system of claim 5, wherein the naming operation is one of: (i) an automatic naming operation, and (ii) a manual naming operation where the user defines the name for the merged application.

7. The system of claim 1, wherein at least one of the first and second executable applications was not created at design time in accordance with the merging platform.

8. The system of claim 1, wherein the communication port exchanges information with a user through a remote user device via a distributed communication network.

9. A computer-implemented method, comprising:
recognizing, by a computer processor of a merging platform, that a user has selected, via a graphical user interface, a first executable application in an application data store by receiving from the user a graphical drag-and-drop operation of a graphical representation of the first executable application into a first merging display placeholder area, the application data store containing information about a plurality of executable applications, including input data and output data associated with each executable application;
recognizing that the user has selected, via the graphical user interface, a second executable application in the application data store;
receiving an indication from the user that an application merging application is to be triggered by receiving from the user a graphical drag-and-drop operation of a graphical representation of the second executable application into a second merging display placeholder area;
responsive to said triggering, merging behaviors of the first executable application and the second executable application, including functionality of the input and output data of each executable application, to create a merged application; and
arranging to facilitate execution of the merged application.

10. The method of claim 9, wherein said merging is further associated with a third executable application in the application data store.

11. The method of claim 9, wherein said second executable application is itself a merged application associated with two other executable applications.

12. The method of claim 9, further comprising:
receiving from the user a trigger to separate the merged application; and
responsive to the trigger, re-creating the first and second executable applications.

13. The method of claim 9, further comprising, prior to said merging:
verifying that the first and second executable applications represent a valid combination; and
transmitting an error indication to the user if the first and second executable applications do not comprise a valid combination.

14. A non-transitory, computer-readable medium storing program code, the program code executable by a processor of merging platform to cause the processor to perform a method, comprising:
recognizing that a user has selected, via a graphical user interface, a first executable application in an application data store by receiving from the user a graphical drag-and-drop operation of a graphical representation of the first executable application into a first merging display placeholder area, the application data store containing information about a plurality of executable applications, including input data and output data associated with each executable application;
recognizing that the user has selected, via the graphical user interface, a second executable application in the application data store by receiving from the user a graphical drag-and-drop operation of a graphical representation of the second executable application into a second merging display placeholder area;
receiving an indication from the user that an application merging application is to be triggered;
responsive to said triggering, merging behaviors of the first executable application and the second executable application, including functionality of the input and output data of each executable application, to create a merged application; and
arranging to facilitate execution of the merged application.

15. The medium of claim 14, wherein the method further comprises:
initiating a naming operation to assign a name to the merged application.

16. The medium of claim 15, wherein the naming operation is one of: (i) an automatic naming operation, and (ii) a manual naming operation where the user defines the name for the merged application.

17. The medium of claim 14, wherein at least one of the first and second executable applications was not created at design time in accordance with the merging platform.

18. The medium of claim 14, wherein the graphical user interface is supported by a communication port that exchanges information with a user through a remote user device via a distributed communication network.

* * * * *